H. DE C. RICHARDS.
CABLEWAY.
APPLICATION FILED SEPT. 26, 1917.
1,347,758.
Patented July 27, 1920.
2 SHEETS—SHEET 1.
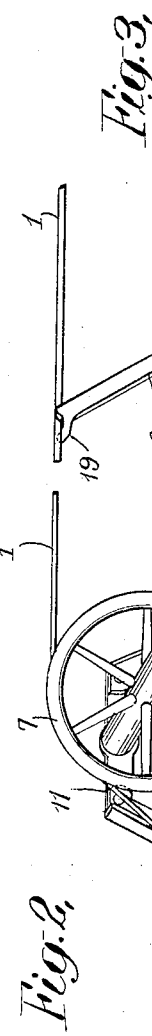
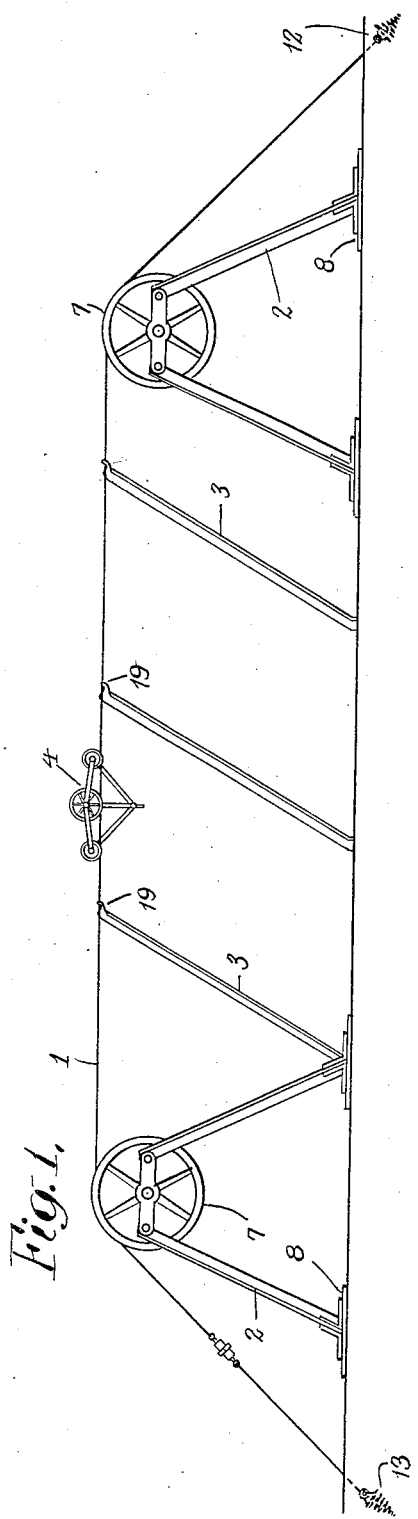
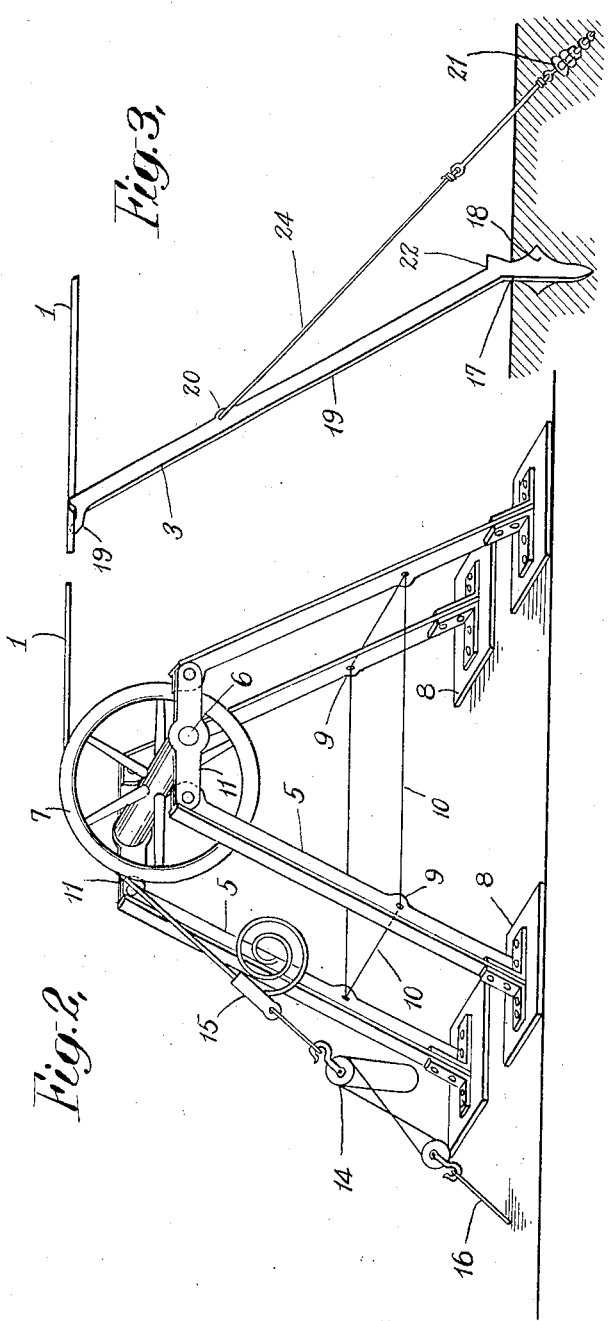
INVENTOR
HARRY DE COURCY RICHARDS.
BY
*Demmee Bugnet*
ATTORNEY

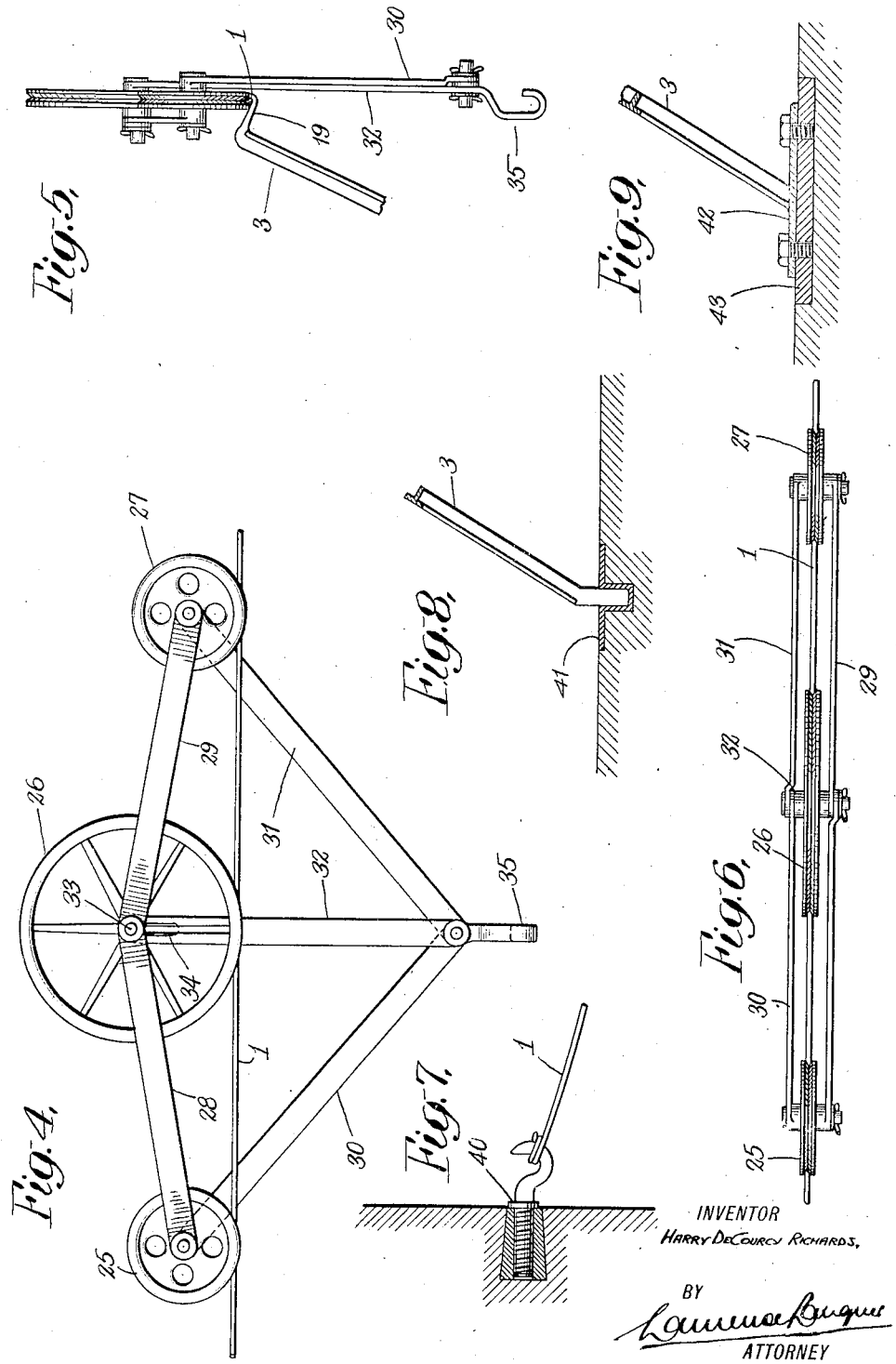

UNITED STATES PATENT OFFICE.

HARRY DE COURCY RICHARDS, OF SAN FRANCISCO, CALIFORNIA.

CABLEWAY.

1,347,758.  Specification of Letters Patent.  Patented July 27, 1920.

Application filed September 26, 1917. Serial No. 193,274.

*To all whom it may concern:*

Be it known that I, HARRY DE COURCY RICHARDS, a citizen of the United States, and resident of San Francisco, in the county of San Francisco and State of California, have invented certain new and useful Improvements in Cableways, of which the following is a specification.

This invention relates to a cableway for transportation of materials or goods, the chief object being to provide a system of this character which is capable of being readily erected and dismantled and which may be transported with facility for erection in any location.

A further object is to render the cableway capable of extension and to make the parts thereof interchangeable and such that they may be cheaply replaced.

A still further object is to provide a bogie or trolley for the cableway which is adapted to compensate for the "sway" or sag in the cable between the supports therefor so as to lessen the drag or resistance offered to the movement of the bogie and the load supported thereby.

The improved cableway is especially applicable for use in modern trench warfare, as it affords a means of rapidly transporting ammunition, supplies and other material from the rear to the fighting line. At the present time, most of the transportation to the front line trenches is made by hand, and in view of the small weights that can be carried by each man, considerable difficulty is experienced in getting sufficient ammunition and supplies to the trenches. By using the improved cableway, this difficulty would be overcome as each man would be able to propel a trolley or train of trolleys of great carrying capacity, and this could be effected with less effort and greater facility than is possible with the method at present in use. In this manner, fewer men would be required for transportation work. The invention, moreover, is adapted for use in industrial plants, harvest fields, underground workings and in any establishment where it is of importance to lessen labor and quicken transportation of more or less heavy material for moderate distances. The improved cableway is capable of ready extension and, consequently, is of great value where material has to be transported in different localities. It can be readily dismantled and carried to the desired location and then erected and used for transportation purposes. Again, it is often of great convenience in industrial establishments, owing to lack of space, to remove the transportation means when it is not in use. The present invention fully meets this requirement and is, therefore, of great utility in such connection.

In order that the said invention may be clearly understood and readily carried into effect, the same will now be described more fully with reference to the preferred embodiment illustrated in the accompanying drawings, in which:—

Figure 1 is a view showing the general arrangement of the improved cableway.

Fig. 2 is a perspective view of the structure for supporting the end of the cable and the means for tensioning and anchoring the same.

Fig. 3 is a view of one of the stanchions for supporting the cable at points intermediate the end supports.

Fig. 4 is a side elevation of the bogie or trolley for use with the cableway.

Figs. 5 and 6 are respectively end and plan views of said trolley.

Fig. 7 shows a form of anchor for the cable when the cableway is used in industrial establishments.

Figs. 8 and 9 are detail views showing methods of securing the intermediate stanchions for use in the same connection.

Referring to the drawings, it will be seen that the cable 1 is supported on end structures 2 and intermediate the end supports, the cable is carried by stanchions 3 which are arranged at suitable intervals so as to minimize the sag in the cable. Trolleys or bogies 4 are adapted to traverse the cable and the latter may be employed to carry boxes, baskets, buckets or carriers containing the material to be transported. The end structure 2 is made up in the form of a quadrilateral support and it comprises members 5 of T or other section which are arranged to support a shaft 6 on which a suitable sheave 7 is rotatably mounted. The lower ends of the members 5 may be provided with suitable feet 8 or they may be pointed so as to be capable of being driven into the ground or they may be seated on blocks arranged on the ground. In order to afford additional security to the quadrilateral support 2 and enable the height thereof to be adjusted, suitable eyes 9 are formed on the members 5 and chains or rods 10 of suitable length may be connected thereto as shown in Fig. 2. The members or legs 5 are pivotally secured at their upper ends to connecting members 11 and the structure is capable of being readily dismantled when it is desired to transfer the cableway to some other location. It will be understood, however, that the end supports 2 may take the form of tripods. One end of the cable 1 is connected to a dead man or anchor 12 which is suitably buried or otherwise secured in the ground. The cable passes from this anchor over the sheave 7 carried by one of the end supports or structures 2 and extends therefrom over the stanchions 3 to the other end support 2 where it passes over the sheave 7 and is connected to another deadman or anchor 13 by means of a pulley tackle or other tensioning device 14. In the arrangement shown in Fig. 2, the end of the cable is provided with a clamp or gripping member 15 and the latter is adapted to be connected to a chain block or pulley tackle 14 which in turn is connected to the member 16 extending from the deadman or anchor 13. It will be seen that the clamp or gripping member is not connected to the end of the cable and the spare length of the latter is suitably coiled up so as to be available for extension of the cableway should it be desired to transport the articles over greater distances. The additional length of cable which is coiled up permits of the end supports 2 being arranged at greater distances apart to allow of the desired transportation. The stanchions 3 are preferably of T or other structural steel section so as to afford great strength with minimum weight. Moreover, the use of section iron or steel facilitates the working and forming of the stanchions. They may, however, be made of pipe or any other form to present lightness, strength and portability. The stanchions 3 are bent, as shown in Fig. 3, to provide clearance for the trolley or bogie traversing the cable. The lower part 17 of the stanchion is spiked or provided with a barbed portion 18 so as to facilitate the driving of said portion into the ground when the stanchion is to be erected. The portion 19 of the stanchion which extends above the ground is bent at an angle to the portion 18 and the upper end thereof is provided with a curved lip or lateral extension 19 which may be formed integral therewith or attached thereto and which is adapted to support the cable. Intermediate its length and at the rear thereof, the stanchion 3 is provided with an eye or perforated lug 20 so as to permit of connection being made with a deadman or anchor 21 suitably located with respect thereto. To facilitate the driving of the stanchion into the ground, the latter at the point intermediate the portions 18 and 19 thereof may be provided with an enlarged portion or driving surface 22 so that the same may be available for hammering or driving the stanchion into the ground. The extension 19 formed on the upper end of the stanchion 3 is preferably obtained by swaging or forging the stanchion into a U hook or other form suitable to receive the cable or rope on which the trolleys or bogies are to travel. The driving surface 22 at the angle of the two portions of the stanchion may be made by upsetting the metal of the stanchion at this point or it may be formed on a separate member which is applied thereto in any other suitable manner. The stanchions would be designed and made of such dimensions as to afford adequate support to the cable or other member and the weight of load to be carried thereby. By bracing the stanchion in the manner hereinbefore described, the strength thereof is materially increased and it is, therefore, not necessary to make the same of such heavy section. The bracing for the stanchion may comprise a simple deadman or anchor 21 which is suitably connected to the eye 20 formed on the stanchion by a cable or wire 24.

Referring to Fig. 4, the bogie or trolley 4 which is to traverse the cable 1 comprises three alined wheels, 25, 26 and 27 which are connected together by means of a suitable link-structure. The three wheels are connected together at one side by means of pivotal links 28, 29 and at the other side the wheels 25 and 27 are provided with two depending links 30, 31 which extend downwardly and are pivotally connected to a link or member 32 depending from the axle 33 of the central wheel 26. The connection between the link 32 and the axle of the wheel 26 is adapted to permit of vertical displacement of said link and with this object in view the axle 33 enters a slot 34 formed in the upper part of the link. The lower end of the link is provided with a hook portion 35 which is bent inwardly directly under the cable so that any weight supported thereby will not tend to displace the trolley or throw the same out of the vertical position. When the central wheel 26 passes over a sagged portion of the cable, it will be lowered with respect to the outer wheels 25, 27. This movement of the wheel 26 will cause the angle between the upper links 28, 29 to be increased and consequently will force apart the two outer wheels 25 and 27. The separation of the wheels 25 and 27 will cause the depending links 30, 31 and the link 32 which is attached thereto to be raised so that the downward movement due to the falling of the middle wheel 26 will be compensated for by this upward movement of the frame. It will be seen, therefore, that the weight carried by the hook portion 35 will have no appreciable vertical movement as the trolley is passing over sagged portions of the cable. The improved trolley will, moreover, tend to reduce sagging of the cable owing to the better distribution of the weight thereon.

When the invention is to be installed in factories, slaughter houses, cotton mills, fisheries and the like, the stanchions can be set up on plates or openings in the floor and the cable anchored to the walls and tensioned by means of pulley tackle or suitable devices. In this case, one end of the cable may be secured to an anchor 40 grouted in the wall of the structure as shown in Fig. 7 preferably through the intervention of a tensioning tackle of any appropriate kind. A similar connection would be provided for the other end of the cable and intermediate these anchors the cable would be supported by means of stanchions 3 similar to those previously described. The lower ends of the stanchions 3 may be secured as shown in Figs. 8 and 9. In the former figure, the lower end of the stanchion is adapted to be inserted in a flanged socket 41 sunk in the floor of the factory or the like, whereas in Fig. 9, the lower end of the stanchion is provided with a foot 42 which is adapted to be bolted to a floor plate 43 situated flush with the floor level. The type of trolley shown in Figs. 4 to 6 inclusive, may be employed with such an installation but it will be understood that one trolley or bogie is required for each carrying device and the capacity of the whole apparatus will depend upon the number of trolleys or bogies which may be run together at the same time. It will be understood that the bogies or trolleys 4 may be lifted on or off the cable 1 quite readily. The idea being that when the load is at the end of a straight line, the boxes, baskets, buckets or other receptacles carried by the trolley can be emptied and the trolley placed in the basket and carried back to the loading point. By using a device of this character, a load of 200 pounds or more may be readily transported by one man and in the ordinary way it would take at least three men to carry such load. In some cases, a number of the trolleys can be harnessed together so that one man may be able to propel and transport a considerable load without difficulty. It will be apparent that it is most important to fasten the ends of the cable securely in position. For illustration, assume it is desired to transport pig metal or shells over a distance of 1500 feet, the weight of each unit to be transported being about 65 pounds. In erecting the cableway for such work, the stanchions 3 would be driven into the ground about 15 feet apart and an anchor provided for each stanchion. An anchor would be placed at each end of the line and just beyond the last stanchion at each end a tripod or quadripod 2 would be arranged to support the cable on its sheave. The legs of each tripod or quadripod would be connected by chains or ropes as previously described so that the legs may be brought to the necessary angle to raise or lower the sheave thereon to exact height to accommodate the cable in the stanchions. The clamp 15 would then be attached to the cable and through the intervention of the differential or chain block 14 connected with the deadman or anchor the necessary tension is placed upon the cable. If two cables are employed, it would of course be necessary to provide additional supports and stanchions for the second cable and it could be arranged alongside the other cableway. The tripods or quadripods for supporting the ends of the cable may be built up of three or four legs of T iron, pipe or other metallic members carrying a six-inch sheave. The legs may be placed on blocks or supports to keep them from sinking in the ground when strain is put on the cable with the blocks. If desired, the cableway can be arranged in looped form so that the two ends thereof are located at the loading station. In this manner, the empty receptacles could be readily run back to the loading station. In practice, however, it is preferred to arrange the cableway as a straight line and the bogies after they have been unloaded and removed from the cable and carried back to the loading position by the workmen.

I claim:

1. In a portable cableway, the combination with a cable of adjustable end supports therefor, inclined stanchions intermediate said end supports and located at one side of the cable, members formed at the ends of said stanchions to receive the cable, means for bracing said inclined stanchions, anchors for said cable, means for tensioning the cable between said anchors to enable trolleys or carriers to traverse said cable.

2. In a portable cableway, the combination with a cable of anchors for the ends thereof, tensioning means intermediate said cable and one of the anchors, inclined stanchions for supporting the cable between said anchors and located at one side thereof, and means for bracing said stanchions.

3. In a portable cableway, the combination with a cable of demountable structures arranged at the ends of the cableway for supporting said cable, means for adjusting the height of said structures, inclined stanchions intermediate said end supports, members formed at the ends of said stanchions to receive the cable, anchors arranged adjacent said stanchions, means for bracing the stanchions to said anchors, and means for anchoring and tensioning the cable over the demountable supporting structures.

4. In a portable cableway, the combination with a cable of vertically adjustable end supports therefor, a plurality of supporting stanchions intermediate said end supports, foot portions on said stanchions, portions extending upwardly from said foot portions, members formed at the ends of said upwardly extending portions for receiving the cable, means for bracing said stanchions, anchors for the cable, and means for tensioning the cable between said anchors.

5. In a portable cableway, the combination with a cable of adjustable end supports therefor, a plurality of supporting stanchions intermediate said end supports, foot portions on said stanchions, upwardly extending portions inclined to said foot portions, members formed at the ends of said inclined portions to receive the cable, enlargements at the angles between said foot portions and the inclined portions for driving the stanchions into the ground, anchors and connections for bracing and supporting the stanchions in operative position, anchors for the cable and means for tensioning the cable between said anchors.

6. In a portable cableway, the combination with a cable of vertically adjustable end supports, stanchions intermediate said end supports, members formed at the end of said stanchions to receive the cable, anchors for said cable and means for tensioning the cable between said anchors.

7. In a portable cableway, the combination with a cable of adjustable end supports therefor, inclined stanchions intermediate said end supports, members formed in the ends of said stanchions for receiving the cable, means for bracing said inclined stanchions, anchors for said cable, and means for gripping said cable and tensioning the same between said anchors.

8. In a portable cableway, the combination with a cable and end supports therefor, of a single inclined stanchion, anchored in the earth or surface over which the cableway runs.

Signed at New York city in the county of New York, and State of New York this 21st day of September A. D. 1917.

HARRY DE COURCY RICHARDS.